United States Patent [19]

Dutta et al.

[11] Patent Number: 5,274,247
[45] Date of Patent: Dec. 28, 1993

[54] OPTIC MODULATOR WITH UNIAXIAL STRESS

[75] Inventors: Mitra Dutta, Matawan; Hongen Shen, Howell; Jagadeesh Pamulapati, Colts Neck, all of N.J.

[73] Assignee: The United States of America as represented by the Secretary of the Army, Washington, D.C.

[21] Appl. No.: 888,222

[22] Filed: May 21, 1992

[51] Int. Cl.⁵ .............................. H01L 27/14
[52] U.S. Cl. ........................ 257/17; 257/21; 257/22; 257/80; 257/85; 359/248
[58] Field of Search ............. 257/21, 22, 17, 80, 257/85; 359/248, 246, 254, 247, 255, 251

[56] References Cited

U.S. PATENT DOCUMENTS

| | | | |
|---|---|---|---|
| 3,464,762 | 9/1969 | Kahng | 359/248 X |
| 4,514,056 | 4/1985 | Azgapetian | 359/246 |
| 5,130,762 | 7/1992 | Kulick | 257/85 |

FOREIGN PATENT DOCUMENTS

| | | | |
|---|---|---|---|
| 1-11227 | 1/1989 | Japan | 359/248 |
| 2-238432 | 9/1990 | Japan | 359/248 |
| 4-30115 | 2/1992 | Japan | 359/248 |

OTHER PUBLICATIONS

H. Shen et al., "Biaxial and uniaxial stress in gallium aresenide on silicon: A linear polarized photoluminescence study", J. Appl. Phys. 68(1), Jul. 1, 1990, 1990 American Institute of Physics, pp. 369-371.

D. H. Rich et al., "Polarized-cathodoluminescence study of uniaxial and biaxial stress in GaAs/Si", Physical Review B, vol. 43, No. 8, Mar. 15, 1991-I, pp. 6836-6839.

*Primary Examiner*—William Mintel
*Attorney, Agent, or Firm*—Michael Zelenka; William H. Anderson

[57] ABSTRACT

An optic modulator which employs strained multiple quantum well structures which are fabricated and spaced from one another such that the stress perpendicular to the direction of the spacing is released leaving only a uniaxial stress along the direction parallel to the spacing. The multiple quantum well structures are then sandwiched between two optic polarizers which are aligned perpendicular to one another. At zero electric field, polarized light passing from the first polarizer is further polarized such that the polarization of the light is rotated to pass through the second polarizer. When an electric field is applied across the heterostructure, light passing through the heterostructure is not further polarized and therefore, the optic signal is interrupted. Thus, optic signals may be modulated with the contrast of polarizing modulators at the speed of superlattice heterostructures.

6 Claims, 1 Drawing Sheet

OPTIC MODULATOR WITH UNIAXIAL STRESS

GOVERNMENT INTEREST

The invention described herein may be manufactured, used, and licensed by or for the Government of the United States for governmental purposes without the payment to us of any royalties thereon.

TECHNICAL FIELD OF THE INVENTION

This invention relates to semiconductor heterostructures utilized in electro-optic devices and more particularly to high contrast, high speed optic modulators for real time objective and pattern recognition.

BACKGROUND OF THE INVENTION

Heretofore, state-of-the-art optic modulators have used either polarization of light, such as in nematic liquid crystal devices, or absorption of light, such as in devices based on the Quantum Confined Stark Effect (QCSE), to modulate optic signals. These devices, however, resulted in either high contrast (10,000:1) and low speed (1 msec-1 usec), liquid crystal devices, or high speed (100 psec-10 msec) and low contrast (100:1), QCSE devices.

As is well known, nematic liquid crystal devices are generally composed of two glass plates with conductive coatings on their inner surfaces and liquid crystal being sandwiched between them. When subjected to an electric field by the conductive coatings, the liquid crystal becomes opaque and reflective thus modulating any light incident to the device.

QCSE devices, in contrast to liquid crystal devices, utilize quantum well superlattice heterostructures and the application of an electric field to vary the absorption resonance of the heterostructure which, in turn, modulates optic signals. The principles behind the QCSE have been more fully explained by D. A. B. Miller et al, in Physics Review, 1985, B32, pg. 1043. Briefly though, in a quantum well at zero electric field, the electron and hole energy levels of the heterostructure are defined by the well width, and generally it is preferred that the electrons and holes are strongly confined in the well layer. When an electric field is applied, the electrons and holes are moved apart and their energies altered. This has the effect of shifting the absorption resonance to lower energy as well as modulating the strength of the absorption. This occurs because direct optical absorption of a photon above the band gap energy involves raising an electron from one of the valence bands and putting it in the conduction band. This is otherwise known as formation of an electron-hole pair. This shift in the absorption resonance, then, provides for the optical modulation of any radiation that is incident to the heterostructure.

As indicated above, the devices based on the QCSE have high speed and poor contrast while liquid crystal devices have low speed and high contrast. Therefore, there still remains a need for a high contrast and high speed optic modulator. The present invention fulfills such a need.

SUMMARY OF THE INVENTION

Accordingly, an objective of the present invention is to provide for a high speed (several psec) and high contrast (10,000:1) optic modulator which can be utilized for real time objective and pattern recognition.

Another objective of the present invention is to provide for a semiconductor optic modulator which operates unaffected by variations in temperature.

In its most generic embodiment, the present invention employs strained multiple quantum well structures fabricated and spaced from one another such that the stress perpendicular to the direction of the spacing is released leaving only a uniaxial stress along the direction parallel to the spacing. The multiple quantum well structures can then be sandwiched between two optic polarizers which are aligned with the heterostructure such that their axes are 45° and −45° off the direction of the uniaxial stress, for example.

The creation of the uniaxial stress results in a decoupling of the heavy and light holes in the valence band which provides for an anisotropic absorption of light at zero electric field. This anisotropic absorption across the heterostructure rotates the polarization of light incident to the heterostructure. Therefore, when light passes through the first polarizer, the polarized light then passing through the heterostructure is further polarized such that the polarization of the light is rotated to pass through the second polarizer. However, when an electric field is applied to the heterostructure, the exciton absorption is nullified and no polarization of the light takes place and therefore, the optic signal cannot pass through the second polarizer. Thus, optic signals may be modulated with the contrast of polarizer devices at the speed of superlattice heterostructures.

BRIEF DESCRIPTION OF THE DRAWINGS

These and other objects of the invention will become apparent in light of the Detailed Description of the Invention and figures wherein.

It is noted that the illustrations herein are not drawn to scale. The particular dimensions such as thickness of the various layers of the multiple quantum well structure with regard to the remainder of the structures depicted have been exaggerated for the purposes of illustration.

DETAILED DESCRIPTION OF THE INVENTION

Figure 1:
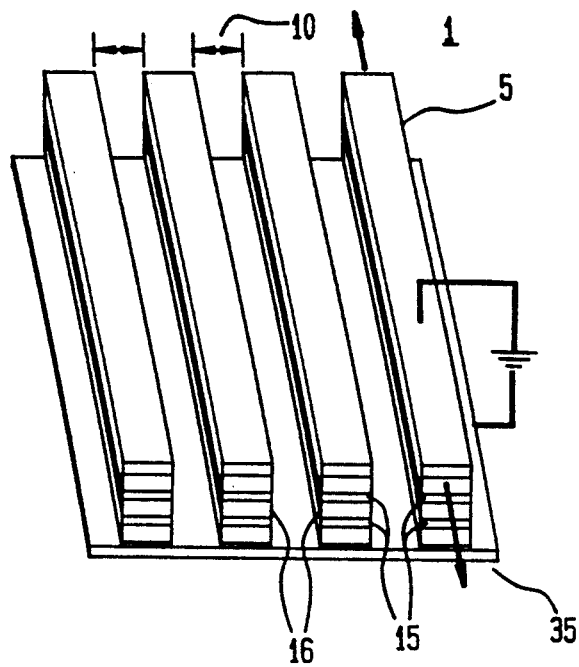
FIG. 1 is an exaggerated perspective illustration of the multiple quantum well structure employed in the present invention.

Referring now to FIG. 1, a multiple quantum well heterostructure 1 according to the present invention is shown. This quantum well heterostructure may be fabricated by any method of molecular beam epitaxy or the like and may be made from any suitable III-V semiconductor materials, such as Indium Gallium Arsenide (InGaAs), acting as the quantum wells 15, with alternating layers of Indium Phosphide (InP), acting as the quantum barriers 16. With present technology, the patterning of the individual heterostructures 5 can be formed in one of two ways, either by epitaxially growing the heterostructure 1 on a patterned substrate of suitable III-V semiconductor material, such as InP, or by etching the spacings 10 after growth of the heterostructure 1 utilizing commonly known lithography techniques. Both of these techniques are well known to those skilled in the art and therefore, do not need any further explanation.

The width of the spacings 10 and the width of heterostructure 5 are predetermined such that the stress perpendicular to the spacing direction (indicated by arrow 35) is released, thereby creating a uniaxial stress parallel to the spacing direction 35. As explained in an article entitled, "Biaxial and Uniaxial Stress in Gallium Arsenide on Silicon: A Linear Polarized Photoluminescence Study," Journal of Applied Physics, Vol. 68, Pg. 369, July 1990, which is incorporated herein by reference, creating a uniaxial stress along the spacing direction 5 results in the decoupling of the heavy and light holes in the valence band. This decoupling of the heavy and light holes due to the uniaxial stress provides an anisotropy in the absorption of optic signals incident to the heterostructure at zero electric field. Thus, light passing through the heterostructure at zero electric field will be polarized.

In the preferred embodiment of the present invention, the width of the quantum wells 15 are fabricated such that the quantum decoupling of the heavy and light holes (due to the application of an electric field) is smaller than the decoupling resulting from the creation of the uniaxial stress along the spacing direction 35, i.e. the confinement energies in the valence band are smaller than the decoupling resulting from the uniaxial stress. With the quantum wells fabricated in this manner, the principle quantum axis of the heterostructure is assured to be parallel to the surface. It should be noted that the above stated condition may be satisfied by several different types of heterostructures all of which could be engineered and manufactured by those skilled in the art. Therefore, the present invention is not limited to any particular method of fabrication or any a specific heterostructure except that the heterostructure must meet the above stated condition.

Given this configuration then, when an electric field is applied, the exciton absorption (or absorption due to the creation of an electron-hole pair) is nullified and no polarization of light takes place. When the electric field is removed, however, the anisotropic absorption of the heterostructure will rotate the polarization of the light as described above. The electric field may be applied via contacts fabricated on the heterostructure. The particular manner by which the contacts may be manufactured may also be in any manner used with the fabrication of other QCSE devices. These techniques are well known and need not be explained further.

Figure 2:
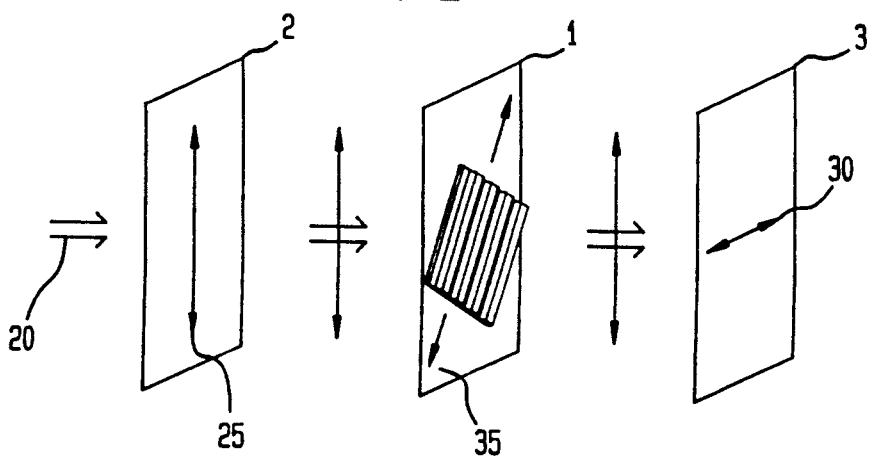
FIG. 2 is an exploded perspective illustration of the operation of one embodiment of the invention with an electric field applied across the quantum well structure.
Figure 3:
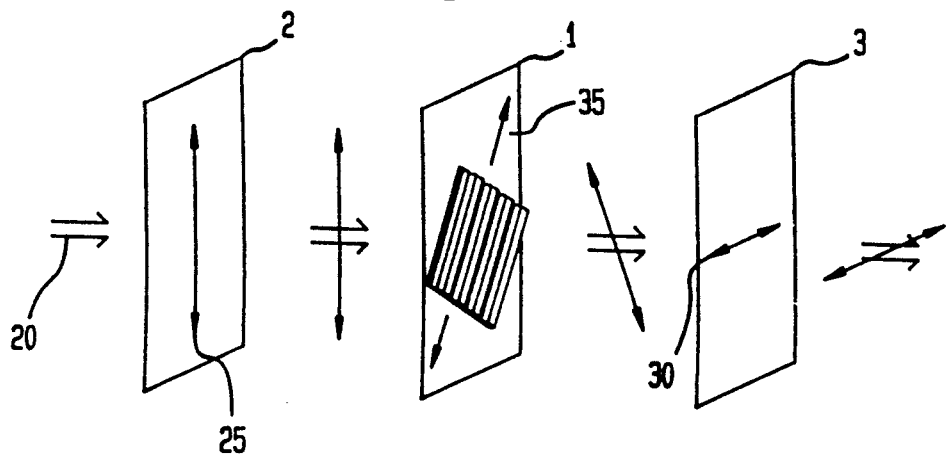
FIG. 3 is an exploded perspective illustration of the operation of one embodiment of the invention with no electric field applied across the quantum well structure.

Since the degree of polarization can be predetermined and engineered to meet most any application, polarizers 2 and 3 may be aligned with heterostructure 1 as shown in the example illustrated in FIGS. 2 and 3. As shown in FIGS. 2 and 3, polarizer 2 is aligned to polarize light vertically (as represented by line 25) and polarizer 3 is aligned to polarize light horizontally (as represented by line 30). Heterostructure 1 is then preferably aligned at a 45° angle (as represented by spacing direction 35) with respect to both polarizers 2 and 3.

In operation, an electric field is applied across the heterostructure 1 so that when light passes through polarizer 2 it is aligned vertically and passes through heterostructure 1 without further polarization. Therefore, because only horizontally polarized light can pass through polarizer 3, the optic signal is interrupted. At zero electric field, however, light passes through polarizer 2 and then is further polarized at a 45° angle by the anisotropic absorption of the heterostructure. Thus, a portion of the optic signal is able to pass through polarizer 3. In this manner, optic signals can be modulated by merely switching a voltage applied to the heterostructure on and off.

As will be appreciated by those skilled in the art, the off state of most QCSE devices is solely controlled by exciton absorption and therefore, these devices are ultrasensitive to temperature variations. However, as explained herein, the off state of the present invention relies upon the quality of the polarizers to interrupt the optic signal and specifically is designed so that little to no exciton absorption takes place. Given this, the present invention may operate in the off state virtually independent of temperature variations. Moreover, because the on state of the present invention relies on the exciton absorption only to rotate the polarization of the optic signal, the on state is also less sensitive to temperature variations than QCSE devices. In this respect, the on and off states of the present invention can be reversed with respect to the application of the voltage by merely altering the alignment of the polarizers. Therefore, the present invention is specifically not to be limited by the alignment of the polarizers described above as those skilled in the art would be able to engineer any myriad of varying polarizer configurations.

As will be further appreciated by those skilled in the art, the amount of contrast of which the present device is capable is dependant upon the quality of polarizers used. Therefore, virtually any type of polarizer as well as any manner of polarizer orientation may be employed in the present invention. Similarly, the intensity and rate of modulation of the present invention will depend upon the manner in which the heterostructure is engineered. Therefore, it is anticipated that many different types of quantum well structures may be used in various applications of the present invention.

Accordingly, although the present invention has been described in relation to a particular embodiment, many other variations and modifications and other uses will become apparent to those skilled in the art. Therefore, the present invention should not be construed to be limited by the specific disclosure herein, but only by the appended claims.

What is claimed is:

1. An optic modulator comprising:
   a quantum well heterostructure formed from a plurality of alternating layers of varying semiconductor materials, the heterostructure having a predetermined length and width and being formed so that a residual stress which is normal to the length of the heterostructure is released such that a uniaxial stress is displaced along the length of the heterostructure, whereby the uniaxial stress causes heavy and light holes of a valence band of the semiconductor materials to decouple at zero electric field, and the heterostructure further being defined as having a top and bottom surface;
   first and second polarizing means disposed at the top and bottom surfaces of the heterostructure;
   means to couple an optical signal to at least one of the polarizing means; and
   means to apply an electric field to the quantum well heterostructure.

2. The optic modulator of claim 1 wherein the first and second polarizing means are aligned perpendicularly to one another.

3. The optic modulator of claim 2 wherein the heterostructure is aligned at approximately a 45° angle to both the first and second polarizing means.

4. The optic modulator of claim 1 wherein the width of the quantum well of the heterostructure is predetermined such that any quantum decoupling of heavy and light holes in the heterostructure caused by the application of an electric field to the heterostructure is not greater than any decoupling of heavy and light holes in the heterostructure which is a result of the uniaxial stress.

5. The optic modulator of claim 1 wherein the heterostructure is further defined as having a principle quantum axis which is parallel to the displacement of the uniaxial stress.

6. The optic modulator of claim 1 wherein the heterostructure comprises alternating layers of indium gallium arsenide and indium phosphide.

* * * * *